United States Patent
Cohen et al.

(10) Patent No.: US 10,853,932 B2
(45) Date of Patent: Dec. 1, 2020

(54) METHOD OF DEFECT DETECTION ON A SPECIMEN AND SYSTEM THEREOF

(71) Applicant: APPLIED MATERIAL ISRAEL, LTD., Rehovot (IL)

(72) Inventors: Elad Cohen, Beer Sheva (IL); Denis Simakov, Rehovot (IL)

(73) Assignee: APPLIED MATERIAL ISRAEL, LTD., Rehovot (IL)

( * ) Notice: Subject to any disclaimer, the term of this patent is extended or adjusted under 35 U.S.C. 154(b) by 102 days.

(21) Appl. No.: 16/249,857

(22) Filed: Jan. 16, 2019

(65) Prior Publication Data
US 2020/0226744 A1 Jul. 16, 2020

(51) Int. Cl.
*G06T 7/00* (2017.01)

(52) U.S. Cl.
CPC .. *G06T 7/0004* (2013.01); *G06T 2207/30148* (2013.01)

(58) Field of Classification Search
CPC .................................................. G06T 7/0004
See application file for complete search history.

(56) References Cited

U.S. PATENT DOCUMENTS

| | | | |
|---|---|---|---|
| 10,290,087 B2 | 5/2019 | Shkalim et al. | |
| 2007/0280527 A1 | 12/2007 | Almogy et al. | |
| 2008/0250384 A1* | 10/2008 | Duffy | G03F 7/7065 716/55 |
| 2010/0074516 A1* | 3/2010 | Kawaragi | G06T 7/001 382/149 |
| 2013/0204569 A1 | 8/2013 | Goren et al. | |
| 2017/0140524 A1 | 5/2017 | Karsenti et al. | |
| 2017/0200264 A1 | 7/2017 | Park et al. | |
| 2017/0206650 A1* | 7/2017 | Kulkarni | G06T 7/001 |
| 2019/0080447 A1* | 3/2019 | Shkalim | G06T 7/001 |

* cited by examiner

*Primary Examiner* — David Bilodeau
(74) *Attorney, Agent, or Firm* — Lowenstein Sandler LLP

(57) ABSTRACT

There are provided a system and method of defect detection on a specimen, the method comprising: performing partitioning for each of one or more portions of a first die; receiving one or more noise maps indicative of noise distribution on second images captured for one or more portions of a second die; performing segmentation for each noise map in runtime, the segmentation for a given noise map including: calculating a score for each region, the given noise map aligned with the regions and each region is associated with noise data aligned therein, the score for a given region calculated at least based on the noise data associated therewith; and associating each region with one segmentation label of a predefined set of segmentation labels indicative of noise levels based on the score, thereby obtaining a set of segments each corresponding to one or more regions associated with the same segmentation label.

20 Claims, 8 Drawing Sheets

METHOD OF DEFECT DETECTION ON A SPECIMEN AND SYSTEM THEREOF

TECHNICAL FIELD

The presently disclosed subject matter relates, in general, to the field of examination of a specimen, and more specifically, to methods and systems of defect detection on a specimen.

BACKGROUND

Current demands for high density and performance associated with ultra large scale integration of fabricated devices require submicron features, increased transistor and circuit speeds, and improved reliability. As semiconductor processes progress, pattern dimensions such as line width, and other types of critical dimensions, are continuously shrunken. This is also referred to as the design rule. Such demands require formation of device features with high precision and uniformity, which, in turn, necessitates monitoring of the fabrication process, including frequent and detailed inspections of the devices while they are still in the form of semiconductor wafers, including both finished devices and/or unfinished devices.

The term "specimen" used in this specification should be expansively construed to cover any kind of wafer, masks, and other structures, combinations and/or parts thereof used for manufacturing semiconductor integrated circuits, magnetic heads, flat panel displays, and other semiconductor-fabricated articles.

Unless specifically stated otherwise, the term "examination" used in this specification should be expansively construed to cover any kind of detection and/or classification of defects in an object. Examination is provided by using, e.g., non-destructive examination tools during or after manufacture of the object to be examined. By way of non-limiting example, the examination process can include scanning (in a single or in multiple scans), sampling, reviewing, measuring, classifying and/or other operations provided with regard to the object or parts thereof, using one or more examination tools. Likewise, examination can be provided prior to manufacture of the object to be examined and can include, for example, generating an examination recipe(s). It is noted that, unless specifically stated otherwise, the term "examination" or its derivatives used in this specification are not limited with respect to the size of the inspected area(s), to the speed or resolution of the scanning or to the type of examination tools. A variety of non-destructive examination tools includes, by way of non-limiting example, optical tools, scanning electron microscopes, atomic force microscopes, etc.

The examination process can include a plurality of examination steps. During the manufacturing process, the examination steps can be performed a multiplicity of times, for example after the manufacturing or processing of certain layers, or the like. Additionally or alternatively, each examination step can be repeated multiple times, for example for different wafer locations or for the same wafer locations with different examination settings.

By way of non-limiting example, run-time examination can employ a two-step procedure, e.g. inspection of a specimen followed by review of sampled defects. During the inspection step, the surface of a specimen or a part thereof (e.g. areas of interest, hot spots, etc.) is typically scanned at relatively high-speed and/or low-resolution. The captured inspection image is analyzed in order to detect defects and obtain locations and other inspection attributes thereof. At the review step the images of at least some of the defects detected during the inspection phase are, typically, captured at relatively low speed and/or high-resolution, thereby enabling classification and, optionally, other analyses of at least some of the defects. In some cases both phases can be implemented by the same inspection tool, and, in some other cases, these two phases are implemented by different inspection tools.

Examination generally involves generating some output (e.g., images, signals, etc.) for a wafer by directing light or electrons to the wafer and detecting the light or electrons from the wafer. Once the output has been generated, defect detection is typically performed by applying a defect detection method and/or algorithm to the output. Most often, the goal of examination is to provide high sensitivity to defects of interest, while suppressing detection of nuisance and noise on the wafer.

There is a need in the art for improving the sensitivity of defect detection.

General Description

In accordance with certain aspects of the presently disclosed subject matter, there is provided a computerized system of defect detection on a specimen, the system comprising: a processing unit operatively connected to an examination tool, the processing unit comprising a memory and a processor operatively coupled thereto, the processing unit configured to: perform partitioning for each portion of one or more portions of a first die of the specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space, wherein the processing unit is further configured to, in runtime: receive, from the examination tool, one or more noise maps indicative of noise distribution on one or more second images captured for one or more portions of a second die of the specimen, the first die and the second die characterized by the same design data; perform segmentation for each of the one or more noise maps, wherein the segmentation for a given noise map of the one or more noise maps is performed by: calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and associating each region with one segmentation label of a predefined set of segmentation labels indicative of different noise levels based on the calculated score, thereby obtaining a set of segments, each corresponding to one or more regions associated with the same segmentation label; wherein the set of segments are usable for defect detection on the specimen based on the given noise map.

In addition to the above features, the system according to this aspect of the presently disclosed subject matter can comprise one or more of features (i) to (xii) listed below, in any desired combination or permutation which is technically possible:

(i). The partitioning can be performed based on the design data, and the plurality of regions in design space can be a plurality of design groups each corresponding to one or more die regions in the given portion having the same design pattern.

(ii). The system further comprises the examination tool configured to capture the image data including a first image representing the given portion. The partitioning can be performed based on the image data, and the plurality of regions in image space can be obtained on the first image based on values of corresponding locations in attribute space specified by a set of attributes characterizing the first image.

(iii). The second die can be a different die from the first die, and the examination tool can be further configured to capture, in runtime, the one or more second images representing the one or more portions of the second die and provide the one or more noise maps indicative of noise distribution on the one or more second images.

(iv). The first die can be a reference die used for performing the partitioning, the second die can be an inspection die, and the partitioning can be performed in a setup phase.

(v). The first die can be a reference die used for inspection of the second die, the second die can be an inspection die, and the partitioning can be performed in runtime.

(vi). The second die can be the first die, the one or more second images can be one or more first images captured for the one or more portions of the first die, and the partitioning can be performed in runtime.

(vii). The examination tool can be an inspection tool configured to scan the specimen to capture the image data and the one or more second images.

(viii). The set of attributes can be selected from a bank of attribute candidates comprising one or more predefined attributes and one or more attributes generated using machine learning.

(ix). The set of attributes can include the one or more attributes generated using machine learning, and the processing unit can be further configured to generate the one or more attributes using a machine learning model.

(x). The machine learning model can be trained by generating training attributes and using the training attributes to predict noise, and the predicted noise can be compared with reference noise generated by a defect detection algorithm to optimize the machine learning model, such that the trained machine learning model is capable of generating the one or more attributes characterizing the first image and representative of spatial patterns thereof indicative of different noise levels.

(xi). The associating each region with one segmentation label can comprise ranking the score calculated for each region and grouping the plurality of regions to the set of segments based on the ranking.

(xii). The performing defect detection can comprise configuring a detection threshold for each segment.

In accordance with another aspect of the presently disclosed subject matter, there is provided a computerized method of defect detection on a specimen, the method comprising: performing partitioning for each portion of one or more portions of a first die of the specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space; receiving, from the examination tool in runtime, one or more noise maps indicative of noise distribution on one or more second images captured for one or more portions of a second die of the specimen, the first die and the second die characterized by the same design data; performing segmentation for each of the one or more noise maps in runtime, wherein the segmentation for a given noise map of the one or more noise maps is performed by: calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and associating each region with one segmentation label of a predefined set of segmentation labels indicative of different noise levels based on the calculated score, thereby obtaining a set of segments each corresponding to one or more regions associated with the same segmentation label; wherein the set of segments are usable for defect detection on the specimen based on the given noise map.

This aspect of the disclosed subject matter can comprise one or more of features (i) to (xii) listed above with respect to the system, mutatis mutandis, in any desired combination or permutation which is technically possible.

In accordance with another aspect of the presently disclosed subject matter, there is provided a non-transitory computer readable storage medium tangibly embodying a program of instructions that, when executed by a computer, cause the computer to perform a method of defect detection on a specimen, the method comprising: performing partitioning for each portion of one or more portions of a first die of the specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space; receiving, from the examination tool in runtime, one or more noise maps indicative of noise distribution on one or more second images captured for one or more portions of a second die of the specimen, the first die and the second die characterized by the same design data; performing segmentation for each of the one or more noise maps in runtime, wherein the segmentation for a given noise map of the one or more noise maps is performed by: calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and associating each region with one segmentation label of a predefined set of segmentation labels indicative of different noise levels based on the calculated score, thereby obtaining a set of segments each corresponding to one or more regions associated with the same segmentation label; wherein the set of segments are usable for defect detection on the specimen based on the given noise map.

This aspect of the disclosed subject matter can comprise one or more of features (i) to (xii) listed above with respect to the system, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "performing", "partitioning", "capturing", "receiving", "calculating", "aligning", "providing", "associating", "generating", "obtaining", "registering", "scanning", "using", "applying", "training", "ranking", "configuring", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of defect detection on a specimen and parts thereof as well as the processing unit therein disclosed in the present application.

The terms "non-transitory memory" and "non-transitory storage medium" used herein should be expansively construed to cover any volatile or non-volatile computer memory suitable to the presently disclosed subject matter.

The term "defect" used in this specification should be expansively construed to cover any kind of abnormality or undesirable feature or void formed on or within a specimen.

The term "design data" used in the specification should be expansively construed to cover any data indicative of hierarchical physical design (layout) of a specimen. Design data can be provided by a respective designer and/or can be derived from the physical design (e.g. through complex simulation, simple geometric and Boolean operations, etc.). Design data can be provided in different formats as, by way of non-limiting examples, GDSII format, OASIS format, etc. Design data can be presented in vector format, grayscale intensity image format, or otherwise.

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

Figure 1:
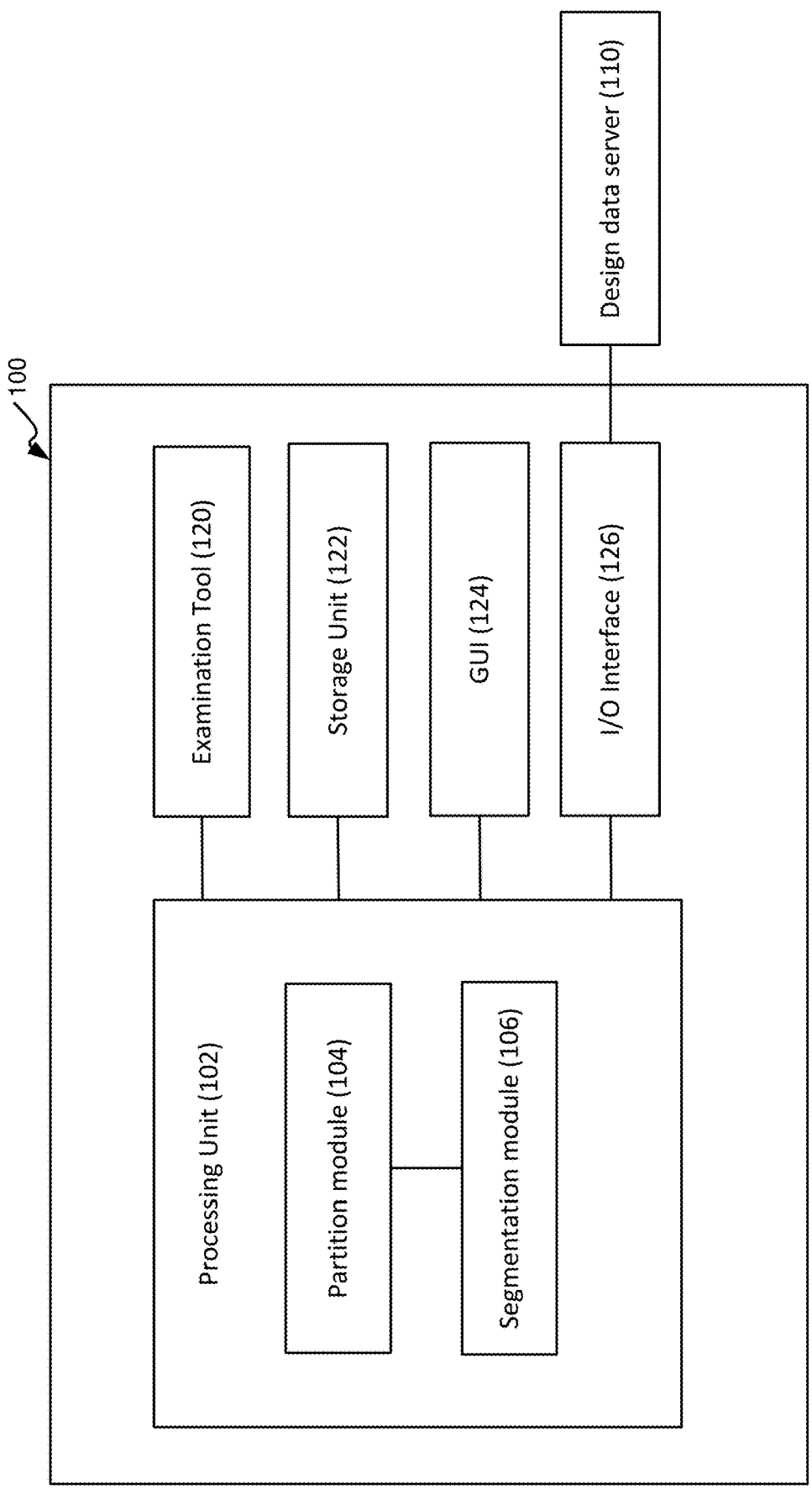
FIG. 1 illustrates a block diagram of a system of defect detection on a specimen in accordance with certain embodiments of the presently disclosed subject matter.

Bearing this in mind, attention is drawn to FIG. 1 illustrating a block diagram of a system of defect detection on a specimen in accordance with certain embodiments of the presently disclosed subject matter.

The system 100 illustrated in FIG. 1 can be used for defect detection on a specimen (e.g. a wafer, a die on the wafer, and/or parts thereof). As aforementioned, the term "specimen" used in this specification should be expansively construed to cover any kind of wafer, masks, reticles and other structures, combinations and/or parts thereof used for manufacturing semiconductor integrated circuits, magnetic heads, flat panel displays, and other semiconductor-fabricated articles. According to certain embodiments, the specimen used herein can be selected from a group comprising: a wafer, a reticle, a mask, an integrated circuit and a flat panel display (or at least a part thereof).

For purpose of illustration only, certain embodiments of the following description are provided with respect to die(s) and wafer(s). Embodiments are, likewise, applicable to other types, sizes and representations of specimen.

According to certain embodiments, system 100 can comprise, or be operatively connected to one or more examination tools 120. The term "examination tools" used herein should be expansively construed to cover any tools that can be used in examination-related processes including, by way of non-limiting example, imaging, scanning (in a single or in multiple scans), sampling, reviewing, measuring, classifying and/or other processes provided with regard to the specimen or parts thereof. The one or more examination tools 120 can include one or more inspection tools and/or one or more review tools. In some cases, at least one of the examination tools 120 can be an inspection tool configured to scan a specimen (e.g., an entire wafer, an entire die or portions thereof) to capture inspection images (typically, at relatively high-speed and/or low-resolution) for detection of potential defects. In some cases, at least one of the examination tools 120 can be a review tool, which is configured to capture review images of at least some of the defects detected by inspection tools for ascertaining whether a potential defect is indeed a defect. Such a review tool is usually configured to inspect fragments of a die, one at a time (typically, at relatively low-speed and/or high-resolution). Inspection tool and review tool can be different tools located at the same or at different locations, or a single tool operated in two different modes. In some cases at least one examination tool can have metrology capabilities.

Without limiting the scope of the disclosure in any way, it should also be noted that the examination tools 120 can be implemented as inspection machines of various types, such as optical imaging machines, electron beam inspection machines and so on.

According to certain embodiments, the examination tool 120 can be configured to capture image data including one or more images for one or more portions of a die of the specimen. The examination tool 120 can be further configured to obtain one or more noise maps indicative of noise distribution on the one or more images. The images can result from different examination modality(s), and the present disclosure is not limited by the inspection and metrology technology used for generating the images. In some embodiments, the examination tool 120 can be an inspection tool configured to scan the specimen to capture the one or more images. In some cases, the captured images of the specimen can be processed (e.g., by an image processing module whose functionality can be either integrated within the examination tool 120 or within the processing unit 102, or implemented as a standalone computer) in order to generate a defect map indicative of suspected locations on the specimen having high probability of being a defect of interest (DOI), as will be described in further detail with respect to FIG. 2. Since DOIs are relatively rare and most of the suspected defects reflected in the defect map are more likely to be noise or false alarms, the defect map is also referred to herein as a noise map.

The term "Defect of interest (DOI)" used herein refers to any real defects that are of the user's interest to be detected. For instance, any "killer" defects that may cause yield loss can be indicated as DOI, as in comparison to nuisance type of defects which are also real defects, but do not impact yield, and therefore should be ignored.

The term "noise" used herein should be expansively construed to include any unwanted or not-of-interest defects (also referred to as non-DOI, or nuisance), as well as random noises that are caused by different variations (e.g., process variation, color variation, mechanical and electrical variations, etc.) during inspection.

System 100 can comprise a processing unit 102 operatively connected to the I/O interface 126 and the examination tool 120. Processing unit 102 is a processing circuitry configured to provide all processing necessary for operating system 100 which is further detailed below with reference to FIG. 2. Processing unit 102 comprises a processor (not shown separately) and a memory (not shown separately). The processor of processing unit 102 can be configured to execute several functional modules in accordance with computer-readable instructions implemented on a non-transitory computer-readable memory comprised in the processing unit. Such functional modules are referred to hereinafter as comprised in the processing unit 102.

Functional modules comprised in the processing unit 102 can comprise a partition module 104, and a segmentation module 106, which are operatively connected with each other. The partition module 104 can be configured to perform partitioning for each portion of one or more portions of a first die of the specimen. The partitioning for a given portion of the one or more portions of a first die of the specimen can be performed based on at least one of: i) image data characterizing the given portion, thereby giving rise to a plurality of regions in image space, and ii) design data characterizing the given portion, thereby giving rise to a plurality of regions in design space.

According to certain embodiments, in some cases, system 100 can be operatively connected to a Design data server 110 (e.g., CAD server) via a hardware-based I/O interface 126. The Design data server 110 is configured to store and provide design data characterizing the specimen. The design data of the specimen can be in any of the following formats: the physical design layout (e.g., CAD clip) of the specimen, a raster image, and a simulated image derived from the design layout. According to certain embodiments, the I/O interface 126 can be configured to receive, from the Design data server 110, design data characterizing a given portion of one or more portions of a die. In cases where the partitioning is performed based on the design data, the plurality of regions in design space can be a plurality of design groups each corresponding to one or more die regions in the given portion having the same design pattern, as described below in further detail with reference to FIGS. 2 and 3.

The segmentation module 106 can be configured to receive, in runtime, from the examination tool, one or more noise maps indicative of noise distribution on one or more second images captured for one or more portions of a second die of the specimen. The first die and the second die are characterized by the same design data. The segmentation module 106 can be further configured to perform segmentation for each of the one or more noise maps. Specifically, the segmentation for a given noise map of the one or more noise maps includes calculating a score for each region of the plurality of regions, where the given noise map is aligned with the plurality of regions and each region thereof is associated with noise data aligned therein. In some embodiments, the score for a given region of the plurality of regions can be calculated at least based on the noise data associated therewith.

Once the score is calculated, the segmentation for a given noise map of the one or more noise maps can include associating each region with one segmentation label of a predefined set of segmentation labels indicative of different noise levels based on the calculated score, thereby obtaining a set of segments each corresponding to one or more regions associated with the same segmentation label. The set of segments constitute segmentation data which can be usable for further examination of the specimen. By way of example, the segmentation data can be provided to the examination tool 120 and/or any other examination tools for detecting defects on the specimen based on the given noise map. In some cases, the segmentation data can be used to adjust the given noise map (e.g., by recalculating at least certain pixels in the difference image and/or grade image) and the defect detection can be performed on the specimen based on the adjusted noise map. By way of another example, the segmentation data can be used by the processing unit for performing defect detection on the specimen based on the given noise map (in which case the processing unit 102 can further comprise a Defect detection module (not illustrated in FIG. 1)). In some embodiments, the segmentation data may comprise a segmentation layout which can be sent to a computer-based graphical user interface (GUI) 124 for rendering the results. The segmentation will be described below in further detail with reference to FIG. 2.

According to certain embodiments, system 100 can comprise a storage unit 122. The storage unit 122 can be configured to store any data necessary for operating system 100, e.g., data related to input and output of system 100, as well as intermediate processing results generated by system 100. By way of example, the storage unit 122 can be configured to store images and/or derivatives thereof produced by the examination tool 120. Accordingly, the one or more images can be retrieved from the storage unit 122 and provided to the processing unit 102 for further processing. Additionally or alternatively, the storage unit 122 can be configured to store the design data of the specimen, which can be retrieved therefrom and provided to the processing unit 102 as input. Additionally or alternatively, the storage unit 122 can be configured to store the partitioning result, i.e., the plurality of regions, which can be retrieved therefrom and provided to the processing unit 102 for further processing.

In some cases, system 100 can be operatively connected to one or more external data repositories (not shown in FIG. 1) which are configured to store data (and/or derivatives thereof) produced by the examination tools 120 and/or the Design data server 110. The image data, the noise map, and/or the design data of the specimen, can be provided to the processing unit 102 for further processing.

In some embodiments, system 100 can optionally comprise a computer-based Graphical user interface (GUI) 124 which is configured to enable user-specified inputs related to system 100. For instance, the user can be presented with a visual representation of the specimen (for example, by a display forming part of GUI 124), including design data and/or image data of the specimen. The user may be provided, through the GUI, with options of defining certain operation parameters. The user may also view the segmentation results as well as other operation results, such as, e.g., defect detection results, on the GUI.

It is to be noted that although it is illustrated in FIG. 1 the examination tool 120 is implemented as a part of system 100, in certain embodiments, the functionalities of system 100 can be implemented as stand-alone computer(s) and can be operatively connected to the examination tool 120 to operate in conjunction therewith. In such cases, the image data of the specimen can be received, either directly or via one or more intermediate systems, from the examination tool 120, and can be provided to the processing unit 102 for further processing. In some embodiments, the respective functionalities of system 100 can, at least partly, be integrated with one or more examination tools 120 thereby facilitating and enhancing the functionalities of the examination tools 120 in examination related processes. In such cases, components of the system 100, or at least part thereof, may form part of the examination tool 120. By way of one example, the partition module 104, and/or the segmentation module 106, can be implemented or integrated as part of the examination tools 120. By way of another example, the processing unit 102 and storage unit 122 may form part of the processing unit and storage, respectively, of examination tool 120; and the I/O interface and GUI of the examination tool 120 may function as I/O interface 126 and GUI 124.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware.

It is noted that the system illustrated in FIG. 1 can be implemented in a distributed computing environment, in which the aforementioned functional modules shown in FIG. 1 can be distributed over several local and/or remote devices, and can be linked through a communication network. It is further noted that although the examination tool 120, storage unit 122, and GUI 124 are illustrated as being part of the system 100 in FIG. 1, in some other embodiments, at least some of the aforementioned units can be implemented as being external to system 100 and can be configured to operate in data communication with system 100 via I/O interface 126.

Figure 2:
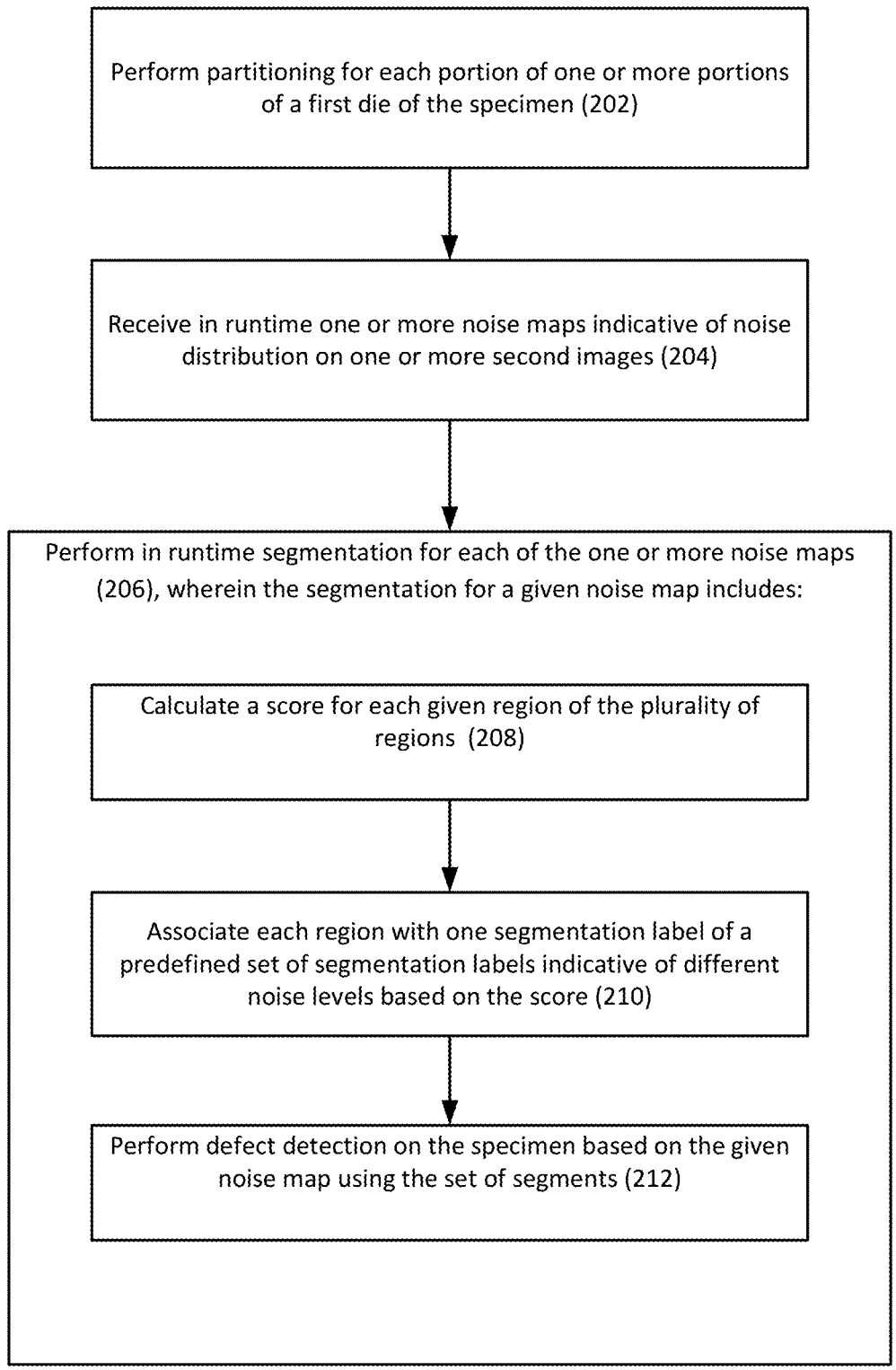
FIG. 2 illustrates a generalized flowchart of defect detection on a specimen in accordance with certain embodiments of the presently disclosed subject matter.

Referring now to FIG. 2, there is illustrated a generalized flowchart of defect detection on a specimen in accordance with certain embodiments of the presently disclosed subject matter.

Partitioning for each portion of one or more portions of a first die of the specimen can be performed (202) (e.g., by the partition module 104 as comprised in the processing unit 102). Specifically, the partitioning for a given portion of the one or more portions can be performed based on at least one of: i) image data characterizing the given portion, thereby giving rise to a plurality of regions in image space, and ii) design data characterizing the given portion, thereby giving rise to a plurality of regions in design space. In some embodiments, the one or more portions can refer to one or more blocks of a die. It is to be noted that a block can be in various sizes and dimensions, such as, e.g., 100*200, 100*1000, 200*2000 pixels in image space, etc., and the present disclosure should not be construed to be limited by a specific implementation thereof.

According to certain embodiments, in some cases, the partitioning can be performed based on design data. In such cases, the plurality of regions are resulted in design space as a plurality of design groups, each corresponding to one or more die regions (in the given portion) having same design pattern.

In the above cases, design data of the given portion or the one or more portions, or design data of the first die can be received (e.g., by the I/O interface 126, from the design data server 110). As aforementioned, the design data can be in any of the following formats: the physical design layout (e.g., CAD clip), a raster image and a simulated image derived from the design layout. Design data of a die (or portion(s) thereof) can comprise various design patterns which are of specific geometrical structures and arrangements. A design pattern can be defined as composed of one or more structural elements each having a geometrical shape with a contour (e.g., one or more polygons).

In some embodiments, the design data as received can be representative of a plurality of design groups each corresponding to one or more die regions having the same design pattern. The clustering of design groups (i.e., the division from CAD data to the plurality of design groups) can be performed beforehand and design group information can be pre-stored in the design data server 110. Thus the design data as obtained by system 100 can already include the design group information. In some cases, the design data as received by system 100 can include only the design group information (e.g., design coordinates of different design groups) without the physical design layout (e.g., CAD clip) information. In some other cases, the design data as received by system 100 can include both the design group information and specific design layout information.

In these embodiments, the partitioning into the plurality of regions can be in accordance with the design group information, e.g., the plurality of regions can correspond to the plurality of design groups. It is to be noted that design patterns can be deemed as "the same" either when they are identical, or when they are highly correlated, or similar to each other. Various similarity measures and algorithms can be applied for matching and clustering similar design patterns, and the present disclosure should not be construed to be limited by any specific measures used for deriving the design groups.

In some embodiments, alternatively and optionally, the clustering of design groups can be performed by the processing unit 102 of system 100 upon receiving the physical design layout of the die (or portion(s) thereof) from the design data server. It is to be noted that the partitioning as described with reference to block 202 can be performed in a setup phase (i.e., prior to production/runtime) or in runtime phase.

Figure 3:
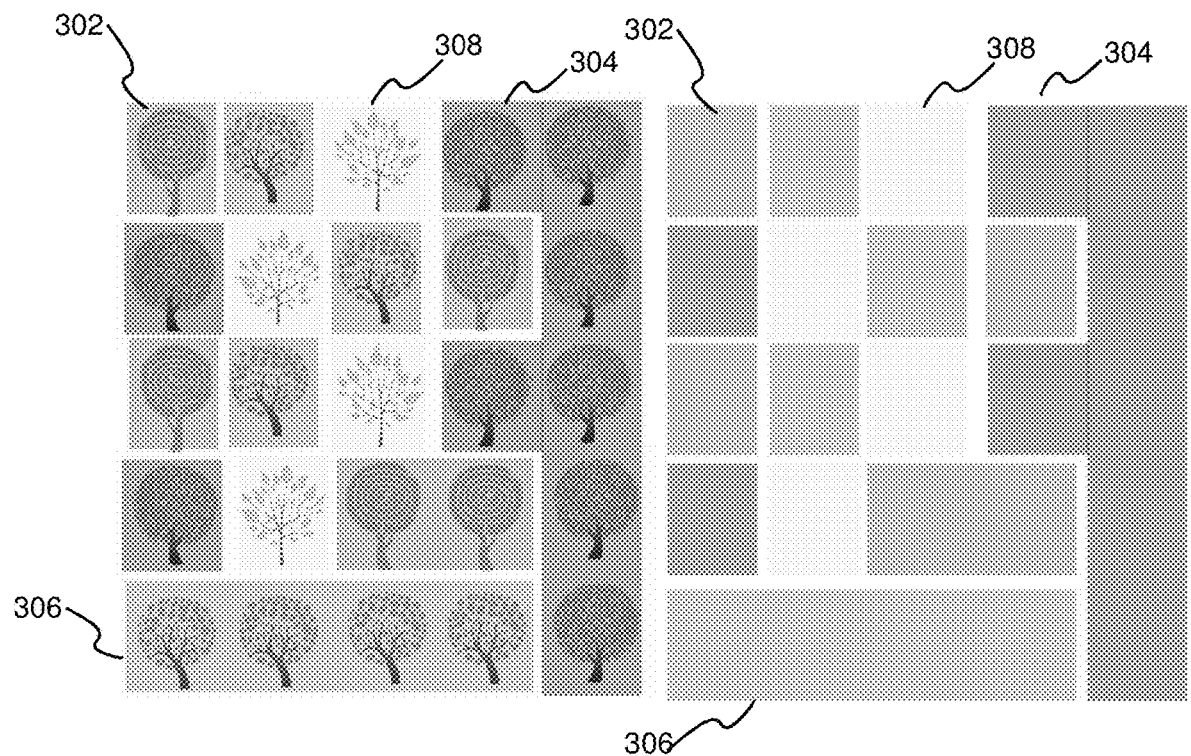
FIG. 3 illustrates a schematic example of design groups in accordance with certain embodiments of the presently disclosed subject matter.

Referring now to FIG. 3, there is illustrated a schematic example of design groups in accordance with certain embodiments of the presently disclosed subject matter.

For illustrative purposes only, design data of a die (or portion(s) thereof) is schematically shown in FIG. 3. Different kinds of "trees" represent different design patterns on the design data. After clustering/grouping similar design patterns, the design data is divided into four design groups 302, 304, 306, and 308 each corresponding to one or more die regions having the same design pattern. It is to be noted that in some design groups, the design patterns are not exactly the same or identical, but rather with high similarity. For example, in design group 304, it can be seen that the pattern in the two regions on the left and the pattern in the regions on the right are slightly different (e.g., are in opposite directions). As aforementioned, in some cases, the design data as received by system 100 can be in the form of the left representation in FIG. 3, which comprises the grouping information, as well as the specific design layouts and patterns. In some other cases, it can be in the form of the right representation in FIG. 3, which comprises only the grouping information (e.g., the locations of the groups in design coordinates). In the present example, the plurality of regions, which result from the partitioning, correspond to the four design groups 302, 304, 306, and 308.

It is to be noted that the example shown in FIG. 3 is only for illustrative purposes and should not be deemed to limit the present disclosure in any way. Any one skilled in the art would readily appreciate that the actual design patterns of a die can be much more complex, therefore the grouping of similar design patterns may vary and in some cases may be much more complicated than the present example.

Continuing with the description of block 202 of FIG. 2, according to certain embodiments, the partitioning can be performed based on image data characterizing a given portion of the one or more portions of the first die (e.g., in lieu of the design data as described above). In such cases, the image data as captured by the examination tool 120 can include a first image representing the given portion. The plurality of regions are resulted in image space and are obtained on the first image based on values of corresponding locations in attribute space specified by a set of attributes characterizing the first image. In such cases, the partitioning can be performed in a setup phase or alternatively in runtime, depending on various scenarios as described in detail below with reference to block 204. Since the partitioning is performed for each of the one or more portions, the examination tool can be configured to capture image data including one or more first images representing the one or more portions of the first die. One advantage of using image data instead of design data is to avoid the need of acquiring and/or processing design data of the specimen, since design data is not always available, e.g., certain customers may be unwilling to provide such data, and in addition, processing design data can be computationally cumbersome and difficult, in particular considering the registration between the design data and image data.

In some further embodiments, the partitioning can be possibly performed based on both image data and design data.

Continuing with the description of FIG. 2, there is now described a runtime segmentation process. One or more noise maps can be received (204) in runtime (e.g., by the processing unit 102 from the examination tool 120), the one or more noise maps being indicative of noise distribution on one or more second images captured for one or more portions of a second die of the specimen. The first die and the second die are characterized by the same design data.

According to some embodiments, the second die can refer to a different die from the first die, and the one or more second images can be captured in runtime (e.g., by the examination tool 120), representing one or more portions of the second die. The one or more noise maps can be provided (e.g., by the examination tool 120) as being indicative of noise distribution on the one or more second images.

In accordance with the abovementioned embodiments, in some cases, the second die can refer to an inspection die (i.e., a die to be inspected in production/runtime), whereas the first die can refer to a test die or a reference die used for performing the partitioning, which is a pre-processing operation for the purpose of serving the runtime segmentation. In such cases, the partitioning based on image data as described above with reference to block 202 can be performed in a setup phase, since it is based on image data (i.e., image of a test die or reference die) different from the inspection images (i.e., the second image) captured in runtime. One of the advantages in such cases is to reduce the computation time and resources as required in runtime inspection and/or detection thereby improving the performance of the system.

In some other cases, the second die can refer to an inspection die, whereas the first die can refer to a reference die used for inspection of the second die (e.g., such as in a Die-to-Reference detection method). By way of example, in a Die-to-Die detection method, the reference die can be a neighboring die of the inspection die on the wafer. In such cases, the partitioning based on image data as described above with reference to block 202 can be performed in runtime, since it is based on image data (e.g., image of a neighboring die) captured in runtime. One of the advantages in such cases is to make the alignment/registration process between the first image (e.g., the plurality of regions on the first image) and the second image (e.g., a noise map corresponding to the second image) easier and computationally-wise less cumbersome and costly, since the reference die and the inspection die are adjacent/next to each other.

According to some further embodiments, the second die and the first die can refer to the same die. Thus the one or more second images are in fact the same as the one or more first images captured for the one or more portions of the first die. In such cases, the second die and the first die can refer to the same inspection die. In such cases, the partitioning based on image data as described above with reference to block 202 can be performed in runtime, since it is based on inspection images captured in runtime. One of the advantages in such cases is to avoid performing alignment/registration between the first image and the second image, which, as mentioned above, can be computationally cumbersome and costly.

In some embodiments, the examination tool can be an inspection tool configured to scan the specimen to capture the image data (i.e., first image (s)) and/or the one or more second images. As aforementioned, in some cases, the inspection tool can be configured to scan the specimen with specific scan configuration(s). The scan configuration can include configuring one or more of the following parameters: illumination conditions, polarization, noise level per area (the areas can be defined in various ways, such as, e.g., predefined based on user/customer information, or defined as related to design patterns, etc.), detection threshold per area, and noise strength calculation method per area, etc. In some cases, the inspection tool is specifically configured with sensitive parameters to enable a sensitive scan of the specimen. By way of example, the sensitive scan may refer to sensitivity to spatial patterns indicative of different noise levels and characteristics such that the inspection images and/or noise maps which result from the sensitive scan, can reflect such patterns and noise information as indicated by the patterns. For instance, the first image(s) can be obtained using a sensitive scan such that the partitioning can take into account more pattern information which resulted from the scan.

According to certain embodiments, a noise map indicative of noise distribution on an inspection image (i.e., a second image) can be obtained. In some cases, the noise map can be obtained using a detection threshold.

The noise map can be generated (e.g., by a detection module and/or an image processing module whose functionality can be either integrated within the examination tool 120 or within the processing unit 102) in various ways. In some embodiments, the noise map can be generated by applying the detection threshold directly on pixel values of the captured inspection image. In some other embodiments, the inspection image of the specimen can be further processed in order to generate the noise map. Different inspection and detection methodologies can be applied for processing the inspection image and generating the noise map, and the present disclosure is not limited by specific detection technologies used therein. For illustrative purposes only, there are now described a few examples of defect detection and noise map generation based on the inspection image.

In some embodiments, for each inspection image, one or more reference images can be used for defect detection. The reference images can be obtained in various ways, and the number of reference images used herein and the way of obtaining such images should not be construed to limit the present disclosure in any way. In some cases, the one or more reference images can be captured from one or more dies of the same specimen (e.g., neighboring dies of the inspection die). In some other cases, the one or more reference images can include one or more images captured from one or more dies of another specimen (e.g., a second specimen that is different from the present specimen but shares the same design data). By way of example, in Die-to-History (D2H) inspection methodology, the inspection image can be captured from a present specimen at a present time (e.g., t=t'), and the one or more reference images can include one or more previous images captured from one or more dies on a second specimen at a baseline time (e.g., a previous time t=0). In some further embodiments, the one or more reference images can include at least one simulated image representing a given die of the one or more dies. By way of example, a simulated image can be generated based on design data (e.g., CAD data) of the die.

In some embodiments, at least one difference image can be generated based on the difference between pixel values of the inspection image and pixel values derived from the one or more reference images. Optionally, at least one grade image can also be generated based on the at least one difference image. The grade image can be constituted by pixels with values computed based on corresponding pixel values in the difference image and a predefined difference normalization factor. The predefined difference normalization factor can be determined based on behavior of normal population of pixel values and can be used to normalize the pixel values of the difference image. By way of example, the grade of a pixel can be calculated as a ratio between a corresponding pixel value of the difference image and the predefined difference normalization factor. The noise map can be generated by determining locations of suspected defects (noises) based on the at least one difference image or the at least one grade image using a detection threshold.

In some embodiments of the presently disclosed subject matter, the detection threshold can be a zero threshold such that the noise map can include all noise information as reflected on the at least one difference image or the at least one grade image.

The obtained noise map can be indicative of noise distribution on the second image. In some embodiments, the noise distribution can comprise one or more noise characteristics of the noises in the noise map as revealed by the detection process, such as, locations of the noises (e.g., on the inspection images). Additionally, the noise characteristics can further include at least one of the following: strength and size of the noises. In some embodiments, the noises in the noise map can comprise pattern-related noises. This type of noises relates to the local density and complexity of the design patterns with which the noises are associated. There can also be other types of noises included in the noise map, such as, e.g., noises caused by the examination tool (e.g., shot noise), process variation, and color variation, etc.

As aforementioned, in cases where the partitioning is performed based on image data, the plurality of regions are resulted in image space, i.e., on the first image based on values of corresponding locations in attribute space specified by a set of attributes characterizing the first image. According to certain embodiments, the set of attributes can be selected from a bank of attribute candidates comprising one or more predefined attributes and one or more attributes generated using machine learning. By way of example, the predefined attributes can be determined based on noise analysis results obtained from previous inspection and detection processes. In some cases, some of the predefined attributes can be obtained from theoretical modeling of existing noise sources, such as, e.g., process variations, measurement noise, algorithmic noise, etc. Some of the predefined attributes can be obtained from image-based feature space decompositions, either fixed (data independent) or data-dependent. In some cases, some of the predefined attributes can be obtained from known layers. Optionally, some attributes may be provided by customers based on customer data.

According to certain embodiments, the set of attributes can include the one or more attributes generated using machine learning. The one or more attributes can be generated (e.g., by the processing unit 102) using a machine learning model. The machine learning model can be trained by extracting training attributes characterizing the training image and using the extracted training attributes to predict noise in the training image. The predicted noise is then compared with reference noise generated by a defect detection algorithm for providing feedback (e.g., by means of loss function) to the machine learning model so as to adjust and optimize the model. Once the model is trained (e.g., the difference between the predicted noise and reference noise is within a range), the model can be used in production/runtime to generate/extract attributes for input inspection images, where the generated attributes are representative of spatial patterns indicative of different noise levels in the input images.

Figure 4:
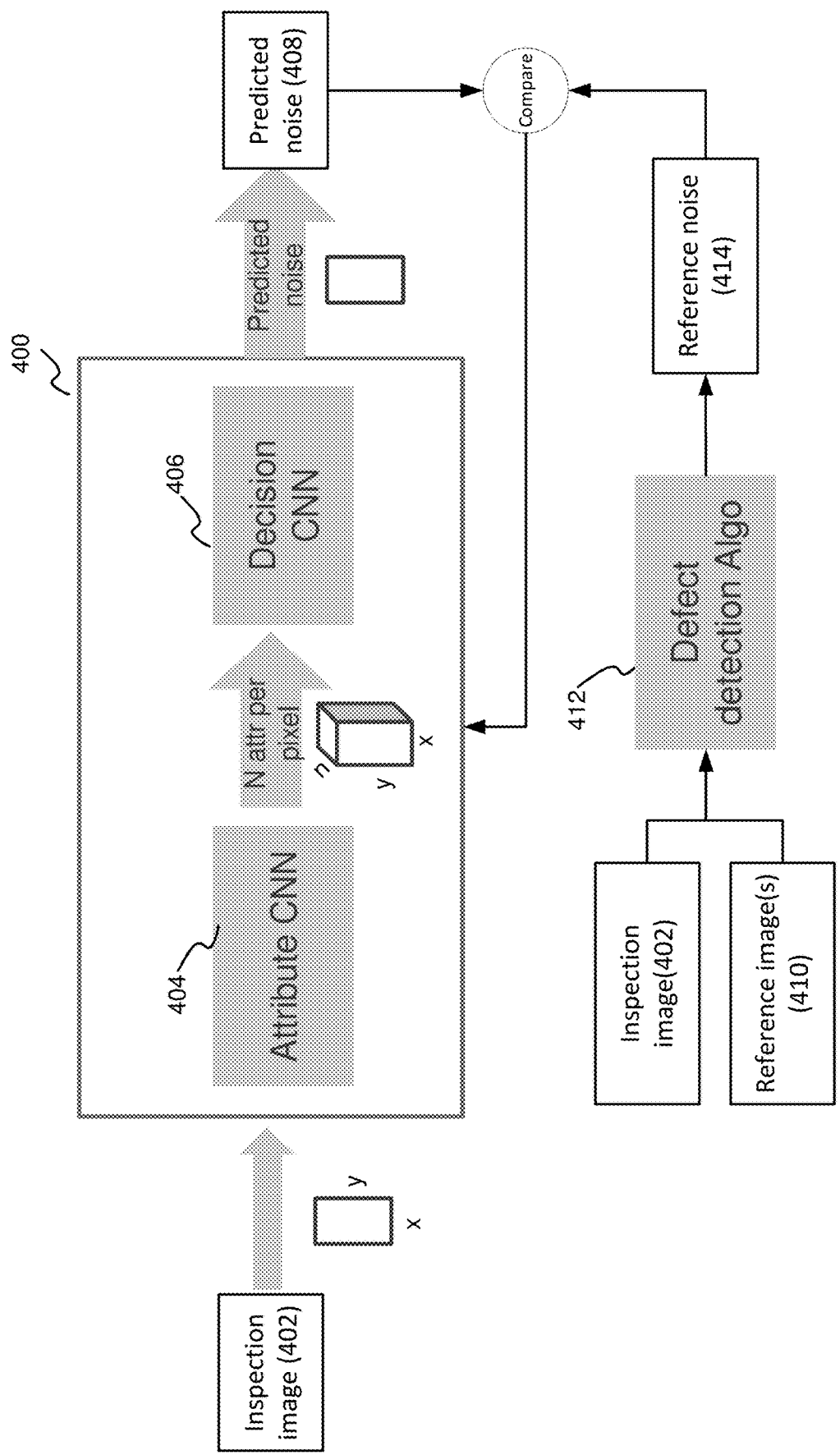
FIG. 4 illustrates a schematic block diagram for training a machine learning model to be capable of generating attributes representative of spatial patterns indicative of different noise levels in accordance with certain embodiments of the presently disclosed subject matter.

Turning now to FIG. 4, there is illustrated a schematic block diagram for training a machine learning model to be capable of generating attributes representative of spatial patterns indicative of different noise levels in accordance with certain embodiments of the presently disclosed subject matter.

For exemplary purpose, the machine learning (ML) model 400 can comprise an attribute neural network (illustrated in FIG. 4 as attribute convolutional neural network (CNN) 404) and a decision neural network (illustrated as decision CNN 406) operatively connected to each other. For training the ML model 400, each time a training image 402 is provided as input to the model 400. The training image is illustrated in FIG. 4 as in the dimension of x*y. The attribute CNN 404 can be configured to extract a set of training attributes (e.g., the set including N attributes) characterizing the training image. In fact, each of the N attributes can be actually an attribute map having the same dimension as the training image (i.e., in the dimension of x*y), such that for each pixel in the image, there is a corresponding attribute value in the attribute map. In other words, each pixel in the inspection image has N corresponding attribute values each from a respective attribute map. Therefore, the set of N attributes in fact are in the dimension of x*y*n, as illustrated in FIG. 4.

The set of N attributes are provided to the decision CNN 406 as input. The decision CNN 406 can be configured to use only the extracted set of candidate attributes to predict noise in the inspection image. By way of example, the predicted noise 408 can be in the form of a grade image (or a difference image) corresponding to the training image as described above, which indicates noise/defect characteristics in the inspection image. For purpose of evaluating the predicted noise, the training image 402 and one or more reference images 410 in parallel undergo a regular defect detection algorithm 412 (e.g., Die-to-Reference detection method) and the detection result which is also in the form of a grade image (or a difference image) can be used as a reference noise 414 to be compared with the predicted noise 408. The reference noise is in fact used as ground truth to evaluate the noise prediction. The comparison result can be provided as feedback (e.g., by means of loss function) to the ML model 400 so as to adjust and optimize the model, such that the ML model 400 can learn to generate better attributes in order to have a better noise prediction result. Such a training process can be repeated with different training images until the model is properly trained (e.g., the predicted noise is close enough to the reference noise, as indicated by the comparison result).

Once the ML model 400 is trained, the trained attribute CNN 404 is capable of generating a set of attributes characterizing each input inspection image, the generated attributes being representative of spatial patterns indicative of noise levels in each input inspection image. Therefore, the trained attribute CNN 404 can be used in setup or runtime for attribute generation for each input inspection image (e.g., the first image). Since the attributes provide good representation of spatial patterns indicative of noise levels in each input inspection image, the partitioning as described above can be based on such attributes in order to obtain partitioned regions pertaining to such patterns. Specifically, the partitioning can be based on values of corresponding locations in attribute space specified by the set of attributes.

By way of example, the attribute values for different locations on each attribute map can be binned and the bins from different attribute maps can be combined to form the partitioning result, i.e., the plurality of regions. However, the present disclosure is not limited to a specific way of performing the partitioning. Other possible ways of partitioning the image based on the set of attributes can be used in addition to, or in lieu of, the above.

Figure 5:
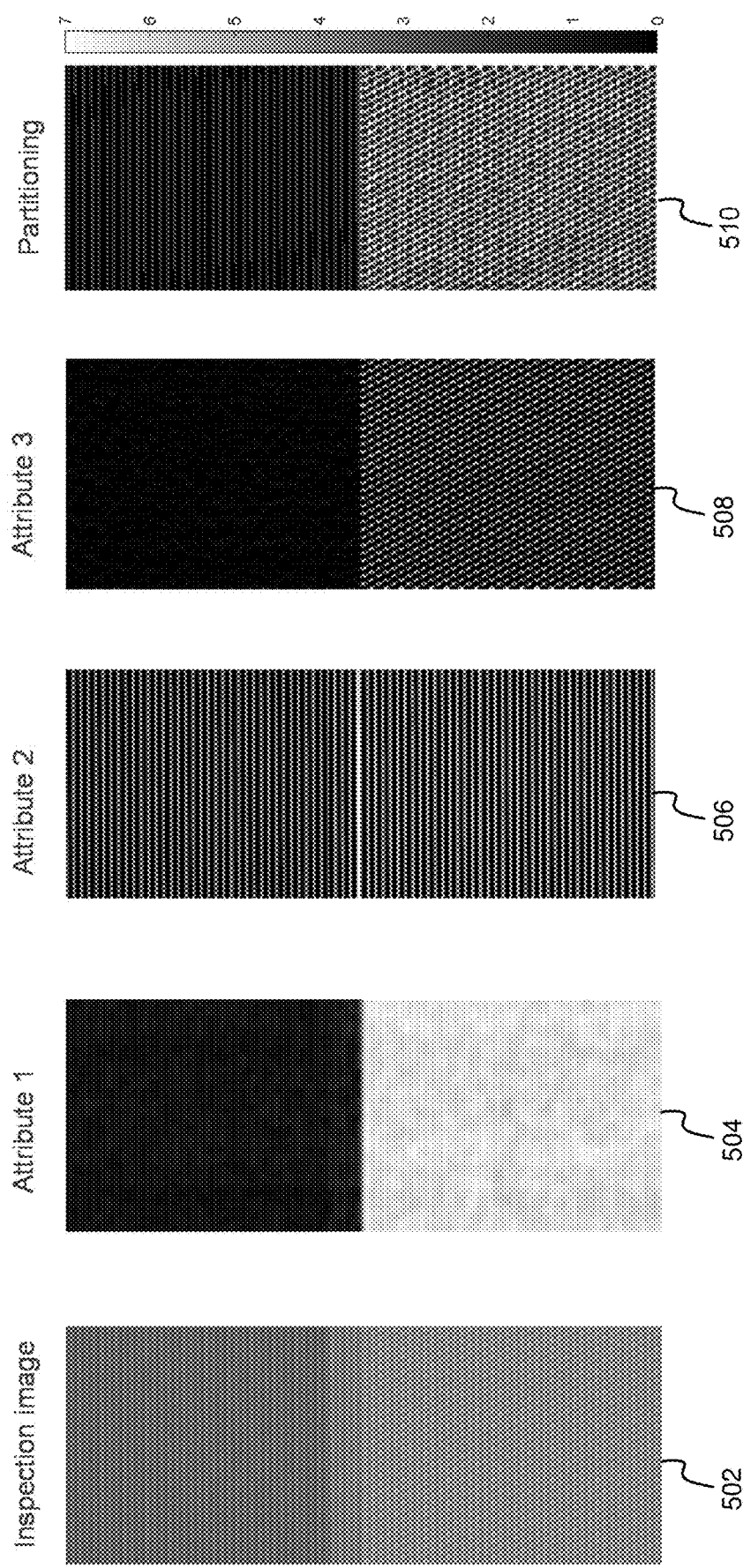
FIG. 5 illustrates an example of an inspection image and a set of attributes characterizing the inspection image in accordance with certain embodiments of the presently disclosed subject matter.

Turning now to FIG. 5, there is illustrated an example of an inspection image and a set of attributes characterizing the inspection image in accordance with certain embodiments of the presently disclosed subject matter.

An inspection image 502 is illustrated, representative of a portion of a die. A set of attributes 504, 506 and 508 are generated characterizing the inspection image 502. The set of attributes can be generated, e.g., by selecting from a bank of attribute candidates comprising one or more predefined attributes and one or more attributes generated using machine learning, as described above. For exemplary and illustrative purposes, attribute 504 can be indicative of circular patterns included in the image, attribute 506 can be indicative of horizontal line patterns included in the image, and attribute 508 can be indicative of vertical line patterns included in the image. By way of example, these attributes can be generated by passing the inspection image through corresponding feature extraction filters. The partitioning result is demonstrated in 510, which illustrates a plurality of regions marked with different gray levels in accordance with a grayscale bar attached thereto. As aforementioned, these regions can be generated in various ways based on the set of attributes. One example, as illustrated in the present figure, is to combine the set of attributes (e.g., overlapping them on top of the other and combining the values in corresponding locations) to form the partitioned regions.

It is to be noted that the above examples of patterns, attributes and partitioning are for illustrative purposes only and should not be construed to limit the present disclosure in any way. For instance, in some cases, the attributes as generated can be indicative of other spatial patterns with different types and sizes in addition to or in lieu of the above, such as, e.g., a rectangular pattern, a triangle pattern, etc. In some cases, certain attributes, especially when generated by a machine learning model, may not necessarily demonstrate a straight-forward illustration of spatial patterns (e.g., the correlation with spatial patterns may not be apparent to human eyes). However, as the machine learning model is specifically trained in such a way, these generated attributes can still be indicative of noise levels in the inspection image, and are thus within the scope of the present disclosure.

Referring back to FIG. 2, segmentation for each of the one or more noise maps can be performed (206) (e.g., by the segmentation module 106) in runtime. Specifically, the segmentation for a given noise map (i.e., any given noise map) of the one or more noise maps can be performed by: calculating (208) a score for each region of the plurality of regions, and associating (210) each region with one segmentation label of a predefined set of segmentation labels indicative of different noise levels based on the calculated score.

For calculating a score (208), the given noise map needs to be aligned with the plurality of regions such that each region of the plurality of regions is associated with noise data aligned therein (i.e., noise data from the noise map that falls within the region, which results from the alignment). The score for a given region of the plurality of regions can be calculated at least based on the noise data associated therewith.

As described above with reference to block 202, the plurality of regions can be resulted in design space or image space based on the data used for partitioning. In cases where the plurality of regions are a plurality of design groups in design space each corresponding to one or more die regions having same design pattern, the given noise map needs to be aligned with the design data, such that each given design group of the plurality of design groups can be associated with noise data within the die regions corresponding to the design group. In cases where the plurality of regions are in image space (e.g., the regions are obtained on the first image based on values of corresponding locations in attribute space specified by a set of attributes characterizing the first image, and the first image is different from the second image), the given noise map needs to be aligned with the image data (i.e., the first image).

The alignment (as in either of the above cases) can be performed in different stages. According to certain embodiments, the alignment can be performed beforehand, e.g., in a setup phase, possibly by a different system, and the aligned result can be received by system 100 for further processing. In some other embodiments, the alignment can be performed by the processing unit 102 in runtime by registering the noise map with the plurality of regions. The registration process can be implemented according to any suitable registration algorithms known in the art (e.g. as described in US2007/0280527, US2013/204569 etc.)

By way of example, in cases where the plurality of regions are in design space, the noise map, which is in inspection coordinates (coordinates in inspection space are referred to as inspection coordinates), can be registered with the design data (e.g., a CAD clip) thereby obtaining for the design data coordinates in inspection space. Some differences between the inspection coordinates of the noise map and the corresponding locations in design coordinates are likely to occur for various reasons—scanning conditions (e.g. illumination) as well as imperfections, shifts and outright errors in the scanning process, errors in the manufacturing of the electric circuit printed on the wafer, and so forth. Position calibration data can be generated informative of a global (e.g. average) offset between the noise map and design data and/or of multiple offsets, each related to a specific region or pattern or object of interest thereof. Optionally, the position calibration data can comprise a data structure specifying respective offsets for each object of interest (or groups thereof). The position calibration data can be stored in the memory as comprised in the processing unit 102 or the storage unit 122.

Figure 6:
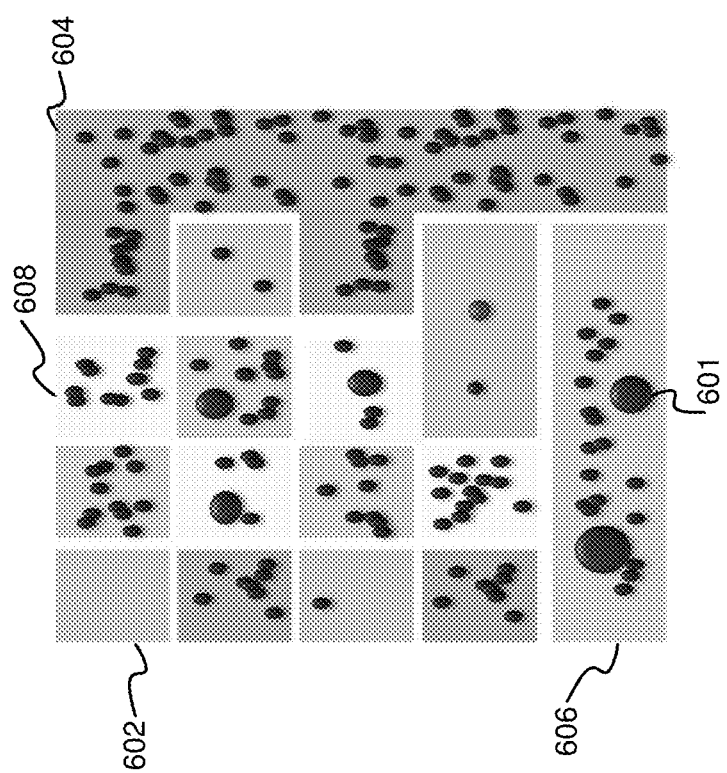
FIG. 6 illustrates a schematic example of an aligned noise map and design data in accordance with certain embodiments of the presently disclosed subject matter.

Referring now to FIG. 6, there is illustrated a schematic example of aligned noise map and design data in accordance with certain embodiments of the presently disclosed subject matter.

Using the registration algorithm as described above, the design groups as derived in FIG. 3 are aligned with a noise map. Noises or noise data in the noise map are illustrated in FIG. 6 as black dots 601 located in different positions with different sizes. The sizes can be indicative of the strength of the noise signals or the actual spatial sizes of the noises. For instance, as described above in the detection process, if the noise map is generated based on a grade image, the strength of a noise in the noise map can be represented by pixel value(s) corresponding to the noise in the grade image. After alignment, the four design groups 302, 304, 306, and 308 are associated with noise data (e.g., represented by the black dots) falling within the die regions respectively corresponding to the design groups. The aligned design groups with associated noise data thereof are marked as 602, 604, 606, and 608 which are provided as inputs for the segmentation process as described below with reference to blocks 208 and 210. In some cases, after alignment, the aligned design groups with noise data can be in inspection coordinates.

It is to be noted that although the alignment illustrated above with reference FIG. 6 is exemplified as between design data and noise map, the regions 302, 304, 306, and 308 may as well represent partitioned regions in image space (i.e., the first image), and the alignment described above can be similarly applied between the noise map and regions in the first image.

Continuing with the description of FIG. 2, as aforementioned, the score for a given region of the plurality of regions can be calculated at least based on the noise data associated therewith. By way of example, the score can be calculated as the noise density in the given region. The noise density can be calculated, e.g., as a ratio of the amount of noises associated with the given region to the area of the region. By way of another example, the score can be derived based on the maximum/minimum pixel values as indicated in the noise data within the region.

According to certain embodiments, a score can be calculated based on the noise data associated with the given region and a defect budget allocated for area of the given region. In an inspection and detection process, a total defect budget is normally allocated for the entire die. The total defect budget refers to the total amount of desired defect candidates that is expected to be detected after the inspection and detection process. Under the assumption that the DOIs have uniform distribution on the die, the total defect budget for the entire die can be divided and allocated to the plurality of regions of the die, e.g., according to area of the regions. For instance, the defect budget allocated for a given region can be calculated as a product of the total defect budget for the entire die and a ratio of the area of the given region to the area of the entire die.

In some embodiments, a noise histogram can be created for a given region based on the noise data associated with the region. The score for the given region can be calculated as a threshold by applying the defect budget allocated for that given region on the noise histogram thereof. By way of example, a noise histogram can be created as the count of pixels (y axis) versus pixel values in the noise map indicating the strength (e.g., the grade) of the noises/defects (x axis). By applying the allocated defect budget to the histogram, a threshold can be derived separating the amount of suspected DOIs that equals to the defect budget from the rest. This threshold can be used as the score for the given region.

It is to be noted that the above described are possible examples of calculating the score, and other suitable methods can be applied in lieu of or in addition to the above.

In some cases, there can be overlapping between the partitioning result, i.e., the plurality of regions. This can be caused, e.g., due to an overlapping spatial relationship between certain structures in different layers of the specimen, in the case of the regions being design groups, or due to, e.g., a specific design of partitioning algorithms in the case of the regions being obtained based on image data. Therefore, once the noise map is aligned with the plurality of regions, the noise data that falls within the overlapping area between different regions need to be considered when associating noise data with the regions, or when calculating the score for the regions. By way of example, the noise data located in the overlapping area between two (or more) regions should only be counted once within one region, therefore it is needed to decide which region this noise data actually belongs to and exclude them from the other overlapped region(s), e.g., when calculating the score for such region(s).

Once the score is calculated for each region, each region can be associated (210) with one segmentation label of a predefined set of segmentation labels indicative of different noise levels based on the calculated score, thereby obtaining a set of segments each corresponding to one or more regions associated with the same segmentation label. In some embodiments, the set of segments can constitute segmentation data which can be usable for further examination of the specimen. By way of example, the segmentation data can be provided to the examination tool 120 and/or any other examination tools or the processing unit for performing (212) defect detection on the specimen based on the given noise map. In some embodiments, the segmentation data may comprise a segmentation layout which can be sent to the computer-based graphical user interface (GUI) 124 for rendering the results.

In some embodiments, for performing the association between the regions and the segmentation labels, the plurality of regions can be ranked according to their scores, and the regions can be grouped into the set of segments based on the ranking (i.e., the ranked regions can be divided into the predefined set of segments based on their ranking). By way of example, the predefined set of segmentation labels can include three labels indicative of noise levels of quiet, noisy and very noisy. Per the segmentation, each region can be labeled as one of quiet region, noisy region and very noisy region according to the ranking of their respective score among all the scores. It is to be noted that the present disclosure is not limited by the number of segmentation labels as predefined in the set.

The segmentation data can be used in various ways for further examination of the specimen (e.g., for performing defect detection on the specimen based on the given noise map). By way of example, the segmentation data can be used to configure a detection threshold for each die segment. For instance, the die segment labeled as very noisy can have a higher threshold as compared to the die segment labeled as quiet. By way of another example, the segmentation data can be used to configure the calculation of a difference image and/or a grade image. For instance, the pixel values in the difference image and/or grade image can be normalized or adapted according to the noise levels of different segments.

Figure 7:
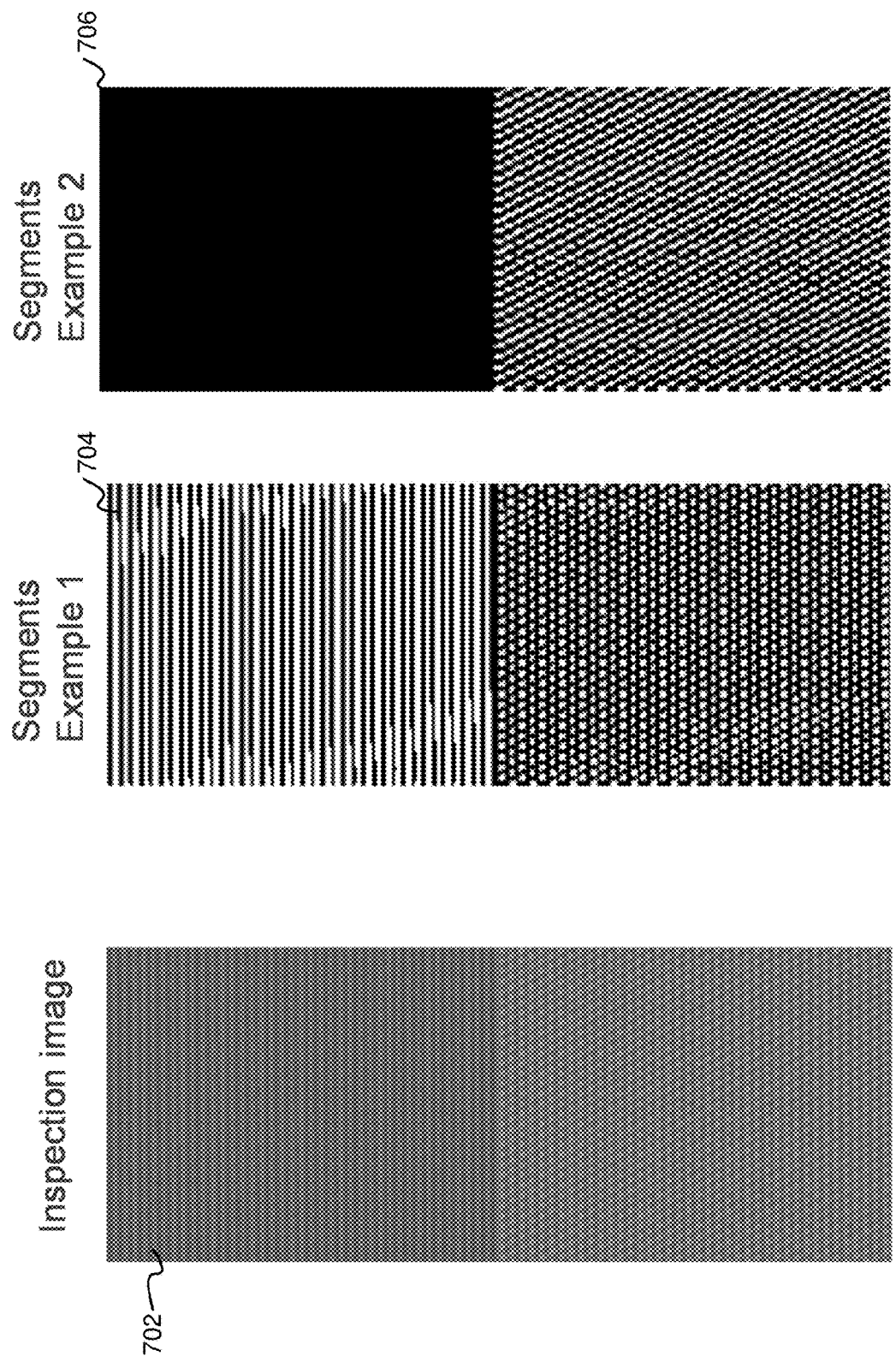
FIG. 7 illustrates examples of segmentation in accordance with certain embodiments of the presently disclosed subject matter.

Referring now to FIG. 7, there are now illustrated examples of segmentation in accordance with certain embodiments of the presently disclosed subject matter.

An inspection image 702 is illustrated (corresponding to the inspection image 502 in FIG. 5), representative of a portion of a die. Two examples of segmentation results 704 and 706 are shown, respectively corresponding to two inspection images (only one inspection image 702 is illustrated in FIG. 7 for purpose of simplicity) which share the same design (e.g., possibly obtained from the same portion in different dies that share the same design data). As shown in both 704 and 706, two segments marked respectively in black and white are obtained, where the segment in black refers to a quiet segment, and the segment in white refers to a noisy segment. The segments can be obtained based on the partitioning result 510 illustrated in FIG. 5. For instance, the plurality of regions obtained in the partitioning result 510 can be aligned with a noise map obtained in runtime, and a score can be calculated for each region according to the description above with reference to block 208. Each region can be assigned with a segmentation label (of quiet or noisy) based on the score in accordance with the teaching above with reference to block 210. By way of example, the difference between the two segmentation results 704 and 706 may result from different noise maps obtained from the examination tool as corresponding to the two inspection images.

Figure 8:
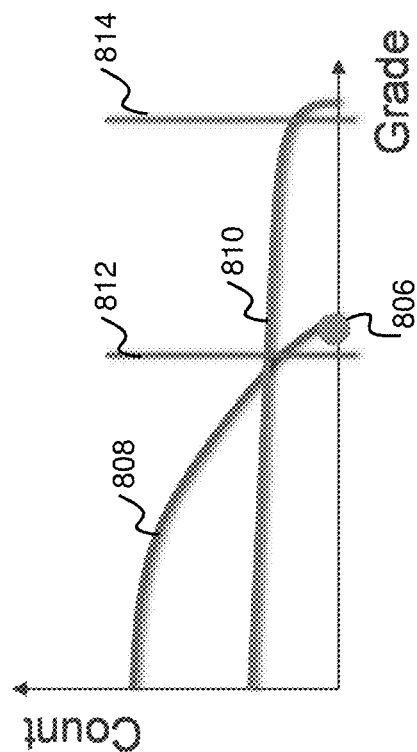
FIG. 8 illustrates an example of using segmentation in runtime examination in accordance with certain embodiments of the presently disclosed subject matter.
Figure 8:
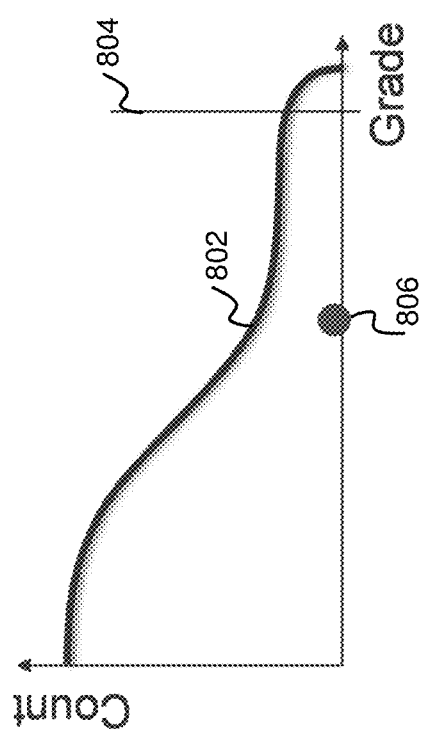

Turning now to FIG. 8, there is now illustrated an example of using segmentation in runtime examination in accordance with certain embodiments of the presently disclosed subject matter.

As shown in FIG. 8, two diagrams are illustrated for purpose of comparison, where the left diagram illustrates a noise histogram 802 which is generated and used in runtime defect detection without using segmentation, and the right diagram illustrates two noise histograms 808 and 810 which are generated instead of one noise histogram and are used in runtime defect detection using segmentation. Specifically, the two noise histograms 808 and 810 correspond to two segments which are obtained through a runtime segmentation process as described above (e.g., the two segments as illustrated in FIG. 7). Thus, instead of applying a single detection threshold 804 on the noise histogram 802, two different detection thresholds 812 and 814 can be assigned respectively for the two histograms 808 and 810. In the present example, the segment corresponding to noise histogram 810 is relatively noisier than the segment corresponding to noise histogram 808. Therefore a higher threshold 814 is applied to the noise histogram 810, and a lower threshold 812 is applied to the noise histogram 808. By applying different thresholds to different segments, different detection sensitivities can be achieved for segments having different noise levels, thereby improving the overall detection sensitivity and defect detection rate. Particularly, in the present example, a DOI 806 in the quieter segment which was previously ignored (as illustrated in the left diagram) in the original defect detection process without segmentation (e.g., since the strength (e.g., the grade) of this DOI, is relatively low as compared to noises in the noisy segment), can now be detected (as illustrated in the right diagram), due to the fact that a relatively low threshold has been applied in this segment.

According to certain embodiments of the presently disclosed subject matter, there is proposed a runtime segmentation process where the segmentation of a specimen (e.g., a die or portion thereof) is performed on a noise map obtained in a runtime inspection and detection process. This is advantageous as compared to segmentation performed in a setup phase on one or more test dies or reference dies which provide only statistical/average noise information. In cases of set-up phase segmentation, once the segmentation is determined based on these dies, it becomes part of an inspection recipe which remains "static" (i.e., unchangeable) and is used in runtime for inspecting each die, irrespective of the specific noise characteristics of a particular die. In comparison, the runtime segmentation as proposed herein is based on actual noise information in a particular inspected die (i.e., runtime noise map), therefore it is die-specific, i.e., the segmentation is dynamic and may vary from die to die, which renders the segmentation results to be more accurate and pertaining to the specific die, thereby improving the detection sensitivity.

In addition, in some embodiments, the partitioning of the specimen into regions in preparation for segmentation, as described above, can be performed based on only image data and without design data (i.e., CAD-less). This not only makes the segmentation to be more adaptive and easier to use (especially in cases where design data is not available), but can also save on computation time and resources which are previously used for processing CAD and/or CAD in relation to image data.

In some further embodiments, the partitioning can be performed based on certain image attributes generated using machine learning techniques. A machine learning model used in this aspect can be trained in a specific manner as described above so as to be capable of generating one or more attributes characterizing given inspection images and representative of spatial patterns thereof which are indicative of different noise levels. This enables the partitioning to be performed without CAD data and still provide accurate results.

It is to be noted that the machine learning model as referred to herein can be implemented in accordance with various machine learning architecture. By way of non-limiting example, in some cases, the machine learning model can be a deep learning neural network (DNN), of which the layers can be organized in accordance with Convolutional Neural Network (CNN) architecture, Recurrent Neural Network architecture, Recursive Neural Networks architecture, GAN architecture or otherwise. It is noted that the teachings of the presently disclosed subject matter are not bound by a specific machine learning architecture.

It is also noted that whilst the flow charts illustrated in in FIG. 2 are described with reference to elements of system 100, this is by no means binding, and the operations can be performed by elements other than those described herein.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer-readable storage medium tangibly embodying a program of instructions executable by the computer for executing the method of the invention.

Those skilled in the art will readily appreciate that various modifications and changes can be applied to the embodiments of the invention as hereinbefore described without departing from its scope, defined in and by the appended claims.

The invention claimed is:

1. A computerized system of defect detection on a specimen, the system comprising:
    a processing unit operatively connected to an examination tool, the processing unit comprising a memory and a processor operatively coupled thereto, the processing unit configured to:
        perform partitioning for each portion of one or more portions of a first die of the specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space;
        wherein the processing unit is further configured, in runtime, to:
            receive, from the examination tool, one or more noise maps indicative of noise distribution on one or more second images captured for one or more portions of a second die of the specimen, the first die and the second die characterized by same design data;
            perform segmentation for each of the one or more noise maps, wherein the segmentation for a given noise map of the one or more noise maps is performed by:
                calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and
                associating each region with one segmentation label of a predefined set of segmentation labels indicative of different noise levels based on the calculated score, thereby obtaining a set of segments each corresponding to one or more regions associated with the same segmentation label;
            wherein the set of segments are usable for the defect detection on the specimen based on the given noise map.

2. The computerized system according to claim 1, wherein the partitioning is performed based on the design data, and wherein the plurality of regions in the design space are a plurality of design groups each corresponding to one or more die regions in the given portion having same design pattern.

3. The computerized system according to claim 1, further comprising the examination tool configured to capture the image data including a first image representing the given portion, wherein the partitioning is performed based on the image data, and the plurality of regions in the image space are obtained on the first image based on values of corresponding locations in attribute space specified by a set of attributes characterizing the first image.

4. The computerized system according to claim 3, wherein the second die is a different die from the first die, and wherein the examination tool is further configured to capture, in runtime, the one or more second images representing the one or more portions of the second die and provide the one or more noise maps indicative of noise distribution on the one or more second images.

5. The computerized system according to claim 4, wherein the first die is a reference die used for performing the partitioning, the second die is an inspection die, and wherein the partitioning is performed in a setup phase.

6. The computerized system according to claim 4, wherein the first die is a reference die used for inspection of the second die, the second die is an inspection die, and wherein the partitioning is performed in runtime.

7. The computerized system according to claim 3, wherein the second die is the first die, and the one or more second images are one or more first images captured for the one or more portions of the first die, and wherein the partitioning is performed in runtime.

8. The computerized system according to claim 1, wherein the examination tool is an inspection tool configured to scan the specimen to capture the image data and the one or more second images.

9. The computerized system according to claim 3, wherein the set of attributes are selected from a bank of attribute candidates comprising one or more predefined attributes and one or more attributes generated using a machine learning model.

10. The computerized system according to claim 9, wherein the set of attributes include the one or more attributes generated using the machine learning model, and wherein the processing unit is further configured to generate the one or more attributes using the machine learning model.

11. The computerized system according to claim 10, wherein the machine learning model is trained by generating training attributes and using the training attributes to predict noise, wherein the predicted noise is compared with reference noise generated by a defect detection algorithm to optimize the machine learning model, such that the trained machine learning model is capable of generating the one or more attributes characterizing the first image and representative of spatial patterns thereof indicative of different noise levels.

12. The computerized system according to claim 1, wherein the associating each region with one segmentation label comprises ranking the score calculated for each region and grouping the plurality of regions to the set of segments based on the ranking.

13. The computerized system according to claim 1, wherein the defect detection comprises configuring a detection threshold for each segment.

14. A computerized method of defect detection on a specimen, the method performed by a processing unit operatively connected to an examination tool, the processing unit comprising a memory and a processor operatively coupled thereto, the method comprising:
performing partitioning for each portion of one or more portions of a first die of a specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space;
receiving, from the examination tool, in runtime, one or more noise maps indicative of noise distribution on one or more second images captured for one or more portions of a second die of the specimen, the first die and the second die characterized by same design data; and
performing segmentation for each of the one or more noise maps in runtime, wherein the segmentation for a given noise map of the one or more noise maps is performed by:
calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and
associating each region with one segmentation label of a predefined set of segmentation labels indicative of different noise levels based on the calculated score, thereby obtaining a set of segments each corresponding to one or more regions associated with the same segmentation label;
wherein the set of segments are usable for defect detection on the specimen based on the given noise map.

15. The computerized method of claim 14, further comprising capturing, by the examination tool, the image data including a first image representing the given portion, wherein the partitioning is performed based on the image data, and the plurality of regions in the image space are obtained on the first image based on values of corresponding locations in attribute space specified by a set of attributes characterizing the first image.

16. The computerized method according to claim 15, wherein the second die is a different die from the first die, the method further comprising capturing, by the examination tool in runtime, the one or more second images representing the one or more portions of the second die and providing the one or more noise maps indicative of noise distribution on the one or more second images.

17. The computerized method according to claim 16, wherein the first die is a reference die used for performing the partitioning, the second die is an inspection die, and wherein the partitioning is performed in a setup phase.

18. The computerized method according to claim 15, wherein the set of attributes include one or more attributes generated using machine learning model, the method further comprising generating the one or more attributes using the machine learning model.

19. The computerized method according to claim 18, wherein the machine learning model is trained by generating training attributes and using the training attributes to predict noise, wherein the predicted noise is compared with reference noise generated by a defect detection algorithm to optimize the machine learning model, such that the trained machine learning model is capable of generating the one or more attributes characterizing the first image and representative of spatial patterns thereof indicative of different noise levels.

20. A non-transitory computer readable storage medium tangibly embodying a program of instructions that, when executed by a computer, cause the computer to perform a method of defect detection on a specimen, the method comprising:
performing partitioning for each portion of one or more portions of a first die of the specimen, wherein the partitioning for a given portion of the one or more portions is performed based on at least one of: i) image data characterizing the given portion, thereby giving rise to a plurality of regions in image space, and ii) design data characterizing the given portion, thereby giving rise to a plurality of regions in design space;
receiving, in runtime, one or more noise maps indicative of noise distribution on one or more second images captured for one or more portions of a second die of the specimen, the first die and the second die characterized by the same design data; and
performing segmentation for each of the one or more noise maps in runtime, wherein the segmentation for a given noise map of the one or more noise maps is performed by:
calculating a score for each region of the plurality of regions, wherein the given noise map is aligned with the plurality of regions and each region thereof is associated with noise data aligned therein, and wherein the score for a given region of the plurality of regions is calculated at least based on the noise data associated therewith; and
associating each region with one segmentation label of a predefined set of segmentation labels indicative of different noise levels based on the calculated score, thereby obtaining a set of segments each corresponding to one or more regions associated with the same segmentation label;

wherein the set of segments are usable for the defect detection on the specimen based on the given noise map.

* * * * *